March 4, 1947. G. A. PERLEY ET AL 2,416,949
CELLS FOR pH MEASUREMENTS
Filed June 10, 1942
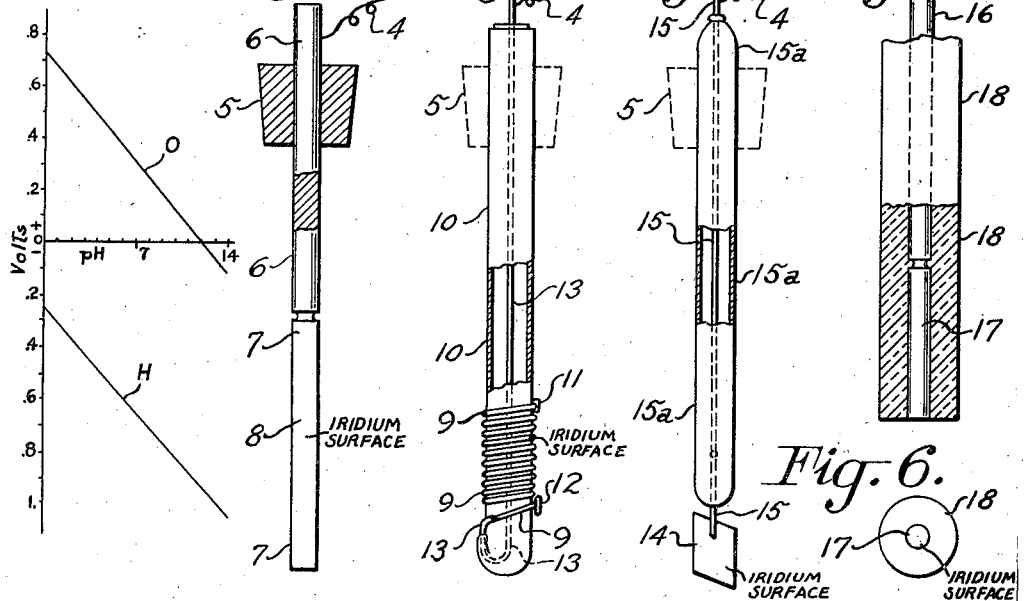
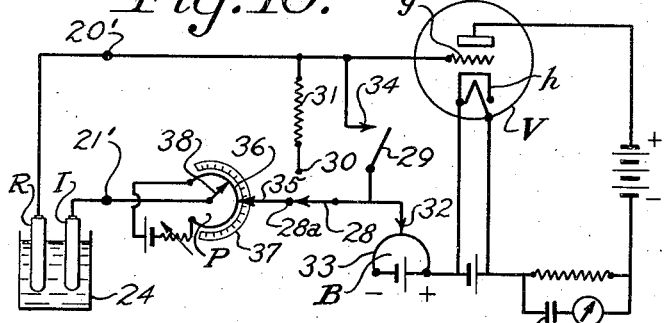
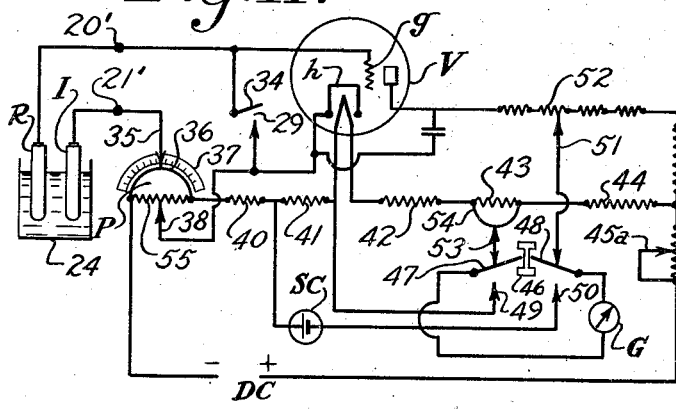
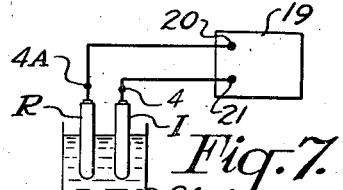
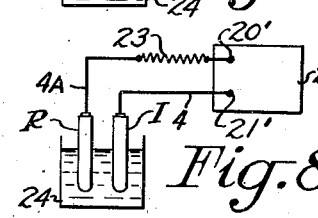
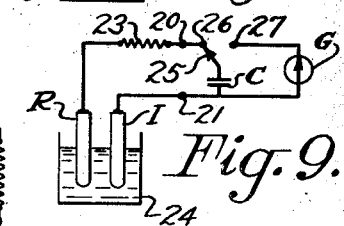
INVENTORS
George A. Perley and
James B. Godshalk
Cornelius L. Ehret
ATTORNEY.

Patented Mar. 4, 1947

2,416,949

UNITED STATES PATENT OFFICE 2,416,949

CELL FOR pH MEASUREMENTS

George A. Perley, Wyncote, Pa., and James B. Godshalk, Bowie, Md., assignors to Leeds and Northrup Company, Philadelphia, Pa., a corporation of Pennsylvania Application June 10, 1942, Serial No. 446,530

8 Claims. (Cl. 204—195)

Our invention relates to measuring electrodes utilized to measure the hydrogen-ion concentration or the hydroxyl ion-concentration, both generically herein termed pH, of aqueous solutions.

In accordance with our invention, a measuring electrode of iridium, itself uncontaminated by occluded molecular hydrogen, is comprised in an ion-concentration cell whose electrolyte, the solution whose pH is to be determined, is essentially free of molecular hydrogen.

Our invention resides in the cells, electrodes and systems for measuring pH hereinafter described and claimed.

For an understanding of our invention, reference is made to the accompanying drawings, in which:

Fig. 1 discloses characteristic curves discussed in explanation of the invention.

Figs. 2 to 5 inclusive are elevational views, partly in section or broken away, of different forms of our electrodes.

Fig. 6 is a bottom plan view of the electrode shown in Fig. 5.

Figs. 7 to 11 inclusive schematically illustrate measuring circuits suited for our electrodes.

This application is in part a continuation of our co-pending application Serial No. 299,960, filed October 18, 1939.

In solutions containing both hydrogen ions and hydroxyl ions, these ions are always present in definite relation to each other; consequently measurement of the concentration of either of these ions is determinative of the individual concentrations of both ions. The pH of a solution is an index of its acidity or alkalinity; it is directly and quickly determinable by measurement of the potential difference between a reference electrode and a measuring electrode, without need for a series of titration measurements, each following an addition of acid or alkali, from which acidity or alkalinity may be indirectly and laboriously determined.

The measuring electrodes previously generally adopted for research or industrial use are the hydrogen gas electrode, the quinhydrone electrode, the glass electrode, and the antimony electrode. However, none of these prior art electrodes is suited for all, or very wide range of kinds of, solutions throughout so great a range as 0 pH to 14 pH and for wide ranges of temperature. As hereinafter appears, our measuring electrode of iridium has advantages not possessed by any one of the prior measuring electrodes.

To distinguish at the outset between our measuring electrode of iridium and a hydrogen gas electrode which may, as in United States Letters Patent 1,846,354 and 1,474,151 to Parker et al. and Keeler, utilize a conductor or connector of iridium, reference is made to Fig. 1 in which curve O is the voltage-pH characteristic of an ion-concentration cell using our iridium electrode and a saturated calomel reference electrode, and in which curve H is the voltage-pH characteristic of an ion-concentration cell using a hydrogen-gas electrode and aforesaid calomel reference electrode.

The potential of the iridium electrode with respect to the selected reference electrode is about $+.73$ volt at 0 pH to about $-.11$ volt at 14 pH (more or less closely approximating the potential pH characteristic of the theoretical oxygen electrode) and with an increment of about .060 volt per pH unit throughout the range from 0 to 14 pH whereas the potential of a hydrogen electrode (whether or not the surface thereof in contact with test solution saturated with molecular hydrogen is iridium), with respect to aforesaid calomel reference electrode is from about $-.25$ volt at 0 pH to about $-1.08$ volts at 14 pH. These potentials of the iridium-calomel electrode system will vary a few millivolts for different degrees of saturation of potassium chloride in contact with the calomel.

For any given reference electrode, whether or not of the calomel type, the potential of the iridium electrode does not, for any magnitude of pH throughout the range from 0 pH to 14 pH, correspond with the potential of the hydrogen electrode. More specifically, the potential/pH characteristics O and H of the iridium and hydrogen electrodes do not meet at any point much less are they coincident. Throughout the range from 0 pH to 14 pH, all potentials of the iridium electrode, which approximate the potentials of the theoretical oxygen electrode, are positive with respect to all potentials of the hydrogen electrode; for each magnitude of pH, the potential of the iridium electrode is positive, by about one volt, with respect to the potential of the hydrogen electrode.

The potential/pH characteristic of an iridium electrode is consistently reproducible for a range including 0 pH to 14 pH, throughout a wide range of temperature such as 0° C. to 100° C., and for practically all aqueous solutions excepting those which contain appreciable amount of molecular hydrogen and/or in which there are appreciable variable oxidation-reduction effects. By way of example, the iridium electrode is suited for measurement of the pH of sugar liquors, paper mill "white water," and of water used for municipal purposes; it is not suited for measurement of the pH of sewage or of laundry bleaching solutions because of concurrent reversible oxidation and reduction reactions.

Should it be confirmed by "redox" potential measurements that a solution includes an oxidation-reduction system but one which is fixed, the effect upon the potential of the iridium electrode of the presence of the oxidation-reduction system must be compensated or neutralized in order that the cell voltage may uniquely represent, or be a measure of, pH: for example, to effect such neutralization the ion-concentration cell may be connected effectively in series opposition to a voltage equal to the fixed potential-difference due to the oxidation-reduction system.

Unlike the hydrogen gas electrode (whether or not utilizing a conductor or connector of iridium), our iridium electrode is satisfactory for use in solutions at temperatures of about 70° C. and higher and in solutions which contain more than inappreciable amounts of $CO_2$, $NH_3$, or other gases contributing to the acidity or alkalinity of the solutions and which would be "scrubbed out," in use of the hydrogen gas electrode, by the molecular hydrogen necessarily bubbled through the solutions.

Unlike the glass measuring electrode, our iridium electrode is suited for pH measurements when the solutions are distinctly alkaline (of pH higher than 9.6) even though there be present an appreciable amount of lithium, sodium or potassium salt; it is physically strong or rugged; it is satisfactory for measurement of pH of solutions at temperatures above about 50° C.

Unlike the antimony electrode, our iridium electrode is not restricted to a useful range of from about 3 pH to 11.5 pH, is immune to presence of a copper or silver salt, and is suited for solutions which are strongly oxidizing. Moreover its potential/ion concentration characteristic is definite whereas the potential of the antimony electrode follows different characteristic curves which within the range of from about 5 to 10 pH may differ as much as 0.8 pH for a given potential. Furthermore, agitation of the test solution, as by stirring, does not affect the potential/pH relation of the iridium electrode, in marked contrast to the effect of stirring when an antimony measuring electrode is used.

Unlike the quinhydrone electrode; our iridium electrode does not tend to contaminate the test solution; it is suited for use at temperatures above about 60° C.

The iridium measuring electrode shown in Fig. 2 comprises a supporting rod 6, of brass or other suitable metal, covered at its lower end with a cap 7 of gold, silver, copper, lead, or other metal upon which iridium 8 may be deposited as herein later explained by electroplating, sputtering, or evaporation. The cork 5 or equivalent is used to suspend the electrode with its lower end, the active electrode surface, in contact with the test solution. Lead 4 is provided for connection of the electrode to a suitable measuring device or network.

The iridium measuring electrode shown in Fig. 3 comprises a wire 9 of gold, silver, copper, lead or other suitable metal, coiled about the lower end of the tube or rod 10 of suitable insulating material, such as glass. The upper end of the coil 9 is anchored by bead 11, fused or otherwise fastened to tube 10, while the lower end of the coil is held by a generally similar anchoring member 12. After the wire 9 is wound on form 10, iridium is deposited upon it by electroplating, sputtering, or evaporation to form the active surface. The conductor 13 for connecting the iridium-coated wire to lead 4 passes through the lower sealed end of tube 10 for attachment to the lower end of coil 9.

Referring to Fig. 4, the iridium electrode is formed by applying iridium, by an electroplating, sputtering, or evaporation process, upon the small thin plate 14, of gold, silver, copper, lead, or the like, attached to the lower end of wire 15 which extends through the tube or rod 15A of suitable insulating material, such as glass.

The iridium electrode shown in Figs. 5 and 6 comprises a rod or bar 16 of brass, or other suitable metal, covered at its lower end by a cap 17 of gold, silver, copper, lead or other metal upon which iridium may be coated as by electroplating, sputtering, or evaporation. The tube 18 in which the rod and cap are cast or which is molded or otherwise formed about them is preferably of "Lucite" (polymethyl methacrylate) or other similar plastic. The lower exposed face of cap 17 is thereafter coated, as by electroplating, sputtering, or evaporation, with iridium to form the active surface of the electrode assembly.

In the modifications of Figs. 2 to 6, the active iridium surface of the measuring electrode is formed by electroplating, sputtering, or evaporation because it has been and still is impossible to procure pure iridium in the form of a sheet or wire. The present day processes of producing iridium sheet or wire involve heating the iridium in atmospheres including molecular hydrogen which contaminates the iridium and renders it unsuited for our use of it as an oxygen electrode for pH measurements.

A preferred procedure for electro-chemically applying the active iridium surface of the electrodes of Figs. 2 to 6 is now described. The base surface of gold, or other equivalent metal, upon which the iridium is to be deposited is cleaned with soap and water, highly burnished with a buffing wheel and then recleaned with soap and water. It is then further cleaned by cathodically polarizing it, in a hot 0.05 molar solution of trisodium phosphate, with a current density, 0.2 to 0.3 amperes per square centimeter, for about ten minutes. This electrode base is then first washed in tap water, and then thoroughly washed in distilled water; the prepared base should then be kept in distilled water until it is to be electroplated.

A preferred plating bath is a solution of chloro-iridious acid prepared by adding 15 milliliters of 95% ethyl alcohol to a solution of 1.3 grams of $H_2IrCl_6$ in 100 milliliters of water. The solution is boiled until the solution changes from dark red to dark brown or black indicating reduction of the iridium to iridious state. The excess alcohol is boiled off, all trace of metallic iridium is removed by filtering, and water added to the resultant solution in quantity sufficient to make 100 milliliters. To this is added 8.4 milliliters of concentrated acid; the resultant solution is about one molar in hydrochloric acid.

Alternatively, the plating bath may be a sulphuric acid solution of iridium chloride.

The preferred anode is of carbon, thoroughly cleaned, soaked in aqua regia for about 12 hours, and then thoroughly washed in distilled water.

The plating operation may be conducted at room temperature for about two or three hours at a current density of about 1.5 milliamperes per square centimeter of exposed cathode surface. The bath should be continuously stirred during the plating operation. A bright adherent plate is obtained.

So forming the iridium surface of the measuring electrode effectively ensures absence of occluded hydrogen having serious effect upon the pH/ion concentration characteristic of the electrode.

It is important that the iridium surface be essentially non-porous; otherwise the base metal also is in contact with the solution and because having pH response characteristic different from the iridium seriously impairs the reliability of the potential/pH characteristic of the electrode.

In attainment of non-porosity, the iridium coating is preferably formed by a series of electroplating operations, each producing a thin deposit which is cleaned and burnished before the next plating operation.

A dense non-porous coating of iridium for the active surface of any of the electrodes shown in Figs. 2 to 6 may be obtained by an evaporation process similar to that disclosed in the article beginning on page 779 of the Journal of Applied Physics, November 1941, and in earlier articles included in the bibliography appended thereto. In brief, the uncoated base electrode is disposed within an exhausted chamber, pressure about $10^{-4}$ millimeter of mercury, in which is also disposed iridium, preferably plated on a tungsten wire heated to a temperature sufficiently high to vaporize the iridium but below the vaporization temperature of the tungsten. The resultant iridium deposit is apparently of molecular fineness and there are no paths, directly or tortuously through the iridium coating, by which the test solution can reach the base metal.

This method of forming the active iridium surface of the iridium electrode also ensures absence of occluded hydrogen.

The iridium may also be deposited in a dense, essentially non-porous layer by a "sputtering" process such as generally described by A. C. G. Beach in vol. 7, pages 193 et seq., of the Journal of Scientific Instruments. Briefly, to two electrodes, one having an iridium surface, disposed in an evacuated chamber is applied a substantially high unidirectional difference of potential. The base member for the measuring electrode (the supporting rod, wire or plate 6, 9, 14, 16 of Figs. 2, 3, 4, 5) to be surfaced with iridium is disposed within the evacuated chamber between the high-voltage electrodes and the degree of vacuum so varied that the base member is just outside of the cathode dark space extending from that high-voltage electrode which serves as the source of iridium. Iridium apparently in atomic or molecular form is deposited upon the base member and forms thereon a functionally unbroken or non-porous surface of iridium free of occluded hydrogen.

Although the iridium electrode is essentially a low impedance electrode (the resistance of an iridium-saturated calomel system in municipal water being of the order of 3000 ohms), it is preferable that it not be connected directly to a detector whose own impedance across its input terminals is low; the measurements of the potential of the iridium electrode should not require a current density of more than about $10^{-7}$ amperes per square centimeter of active electrode surface, otherwise errors due to polarization may occur.

If the detector, generically illustrated by rectangle 19, Fig. 7, is of high impedance type, the leads 4, 4A from the iridium electrode I and the reference electrode R of cell 24 may directly connect to the input terminals 20, 21 of the detector; but if the detector is of the low impedance type, generically illustrated by rectangle 22, Fig. 8, resistance of suitably high magnitude should be included in the electrode circuit to insure suitably low current demand upon the ion-concentration cell 24 comprising the iridium electrode I, reference electrode R, and the test solution. Specifically, a resistor 23 having, for example, resistance of the order of 10 megohms or more, may be included in circuit with the leads 4, 4A to the input terminals 20', 21', of the detector system. The minimum magnitude of resistance 23 may be calculated when the area of the active surface of electrode I and constants of the detector circuit are known.

An ion-concentration cell having our iridium electrode preferably should not directly be connected across a galvanometer, or included in an ordinary potentiometer or similar network; without resistance 23, the current demand upon the electrode is too high for accurate measurements.

A suitable and simple low impedance detector circuit using an ordinary galvanometer G is shown in Fig. 9. To measure the voltage of the ion-concentration cell 24, the movable switch contact 25 is first thrown to the left into engagement with contact 26 to connect cell 24 in series with condenser C and high resistance 23. Current flows from cell 24 until condenser C is charged to a voltage equal to that produced by cell 24; the magnitude of the charging current is limited by resistance 23 to preclude polarization errors. The contact 25 is then thrown to the right into engagement with contact 27 to connect condenser C across galvanometer G. The discharge of the condenser causes the galvanometer, used as a ballistic instrument, temporarily to deflect from its neutral position to an extent representative of the voltage produced by cell 24. The galvanometer scale may be calibrated in pH so that by reading the maximum of the pointer swing occurring upon discharge of condenser C the ion-concentration of the solution in cell 24 may be directly ascertained.

The condenser C should not be of a type, for example electrolytic, which permits flow through the condenser of appreciable leakage current; a high-grade mica condenser is satisfactory. By utilizing a large condenser, for example, one having a capacity of about 1 microfarad, a relatively large flow of current through the galvanometer momentarily occurs upon discharge of the condenser C therethrough, notwithstanding the current drain upon cell 24 for charging the condenser is very small or such as not to cause polarization of the electrode I.

The high impedance detector circuit shown in Fig. 10 (and circuits similar thereto disclosed in Wunsch Patent No. 2,285,482) is suitable for direct connection to the iridium and reference electrodes without need for current-limiting resistance 23 in the connections to its input terminals 20', 21'. When switch contacts 28, 29 are in the positions indicated, three voltages are in series between the control electrode or grid $g$ and cathode $h$ of thermionic tube V; they are the voltage produced by ion-concentration cell 24, a balancing voltage produced by potentiometer P, and a biasing voltage, for the control electrode, produced by network B, or equivalent source.

With movable contact 28 in engagement with contact 30 to include high resistance 31 in the input circuit of tube V in substitution for the cell 24 and potentiometer P, aforesaid biasing voltage is adjusted, if necessary, as by movement of contact 32 along slidewire 33 of network B, until there is no change in magnitude of the anode current of tube V—indicated by null deflection of galvanometer G (in circuit with condenser K, as in aforesaid Patent No. 2,285,482)— upon movement of contact 29 into or out of engagement with contact 34. After the detector is so compensated for any drift or change which may have occurred in the thermionic tube constants or the voltages applied to the tube electrodes, switch 28 is returned into engagement with contact 28a with the assurance that zero change of anode current upon opening and closure of contacts 29, 34 is indicative of balance between the voltage produced by ion-concentration cell 24 and the opposed voltage of potentiometer P. Resistance 31 is not of critical magnitude; it may for example be of any resistance within the range of from 1 to 100 megohms.

To determine the magnitude of the voltage produced by cell 24, and therefore the ion-concentration of the test solution, the contact 35 of potentiometer P is adjusted along its slidewire 36 until there is no change in magnitude of the anode current of tube V—indicated by null deflection of galvanometer G—when contacts 29, 34 are opened or closed.

The scale 37 of the potentiometer P may be calibrated directly in pH values. For covering a wide range of pH, the connection from the ion-concentration cell 24 to the potentiometer is to a point whose potential is intermediate the potentials of the terminals of slidewire 36; for example, to tap 38 which is preferably adjustable through a small range to suit one and the same scale 37 to different iridium electrodes whose voltage ion-concentration curves may have slightly different zero-voltage intercepts. The proper setting of tap 38 is determined by using a solution of known pH in cell 24, setting contact 35 to the corresponding pH graduation of scale 38, and then adjusting tap 38 for null deflection of galvanometer G upon closure or separation of contacts 29, 34; it is of course assumed the biasing voltage has previously been adjusted to proper magnitude as above described.

During the measurements, the current through slidewire 36 should be maintained at that standard value for which scale 37 is calibrated; for simplicity, the usual re-standardizing circuit, including a standard cell, is not shown.

The manipulation of contacts 28, 29 and adjustment of contacts 32, 35 may be effected manually, or automatically by the mechanism disclosed in Williams application Serial No. 128,636, filed March 2, 1937, Patent No. 2,312,945, March 2, 1943.

Referring to Fig. 11, which discloses a high impedance detector similar to those shown in United States Letters Patent No. 2,108,294 to Doyle et al., one of the electrodes of cell 24 is connected to input terminal 20' connected to the control electrode g of tube V, and the other cell electrode is connected to input terminal 21' connected to contact 35 adjustable along slidewire 36 of balancing potentiometer P which is connected in series with resistances 40—45 across a suitable source of direct-current voltage DC.

To check the current through slidewire 36, the button of switch 46 is depressed so that its movable contacts 47, 48, connected to galvanometer G, engage the contacts 49, 50 of the standardizing circuit including standard cell SC. The standardizing resistance 45 is then adjusted, if necessary, until the voltage drop across resistor 41 is equal, as indicated by null deflection of galvanometer G, to the voltage of the standard cell SC.

To adjust the system to correct for change in the tube constants, the switch 29, 34 is closed to apply zero voltage to the input electrodes g, h of the tube. Then for a desired setting of contact 51 along resistance 52, and with the contacts 47, 48 of switch 46 in their upper indicated position, the contact 53 is adjusted along slidewire 54, in shunt to resistor 43, until there is null deflection of galvanometer G. Switch 29, 34 is then opened and the system is in condition for accurate measurement of the voltage produced by cell 24.

After the system has been so restandardized and adjusted to the tube constants, the ion-concentration of the solution in cell 24 is measured by adjusting contact 35 of potentiometer P until there is null deflection of galvanometer G; the ion-concentration may then be read directly from scale 37.

The tap 38 is preferably adjustable along slidewire 36, or as illustrated along resistance 55 in shunt thereto, to compensate, as in Fig. 10, for any slight differences between the zero-voltage intercepts of the potential/ion concentration characteristics of different iridium electrodes.

The adjustments of contacts 35, 45a and 53, and operation of switches 29, 34 and 46 may be effected manually or automatically by mechanism similar to that disclosed in the aforesaid Williams patent.

The measuring electrode I in any of Figs. 7 to 11 may be structurally of any of the types shown in Figs. 2 to 6. With any of our iridium electrodes, the test solution whose pH is to be determined should be in contact with atmospheric air or atmosphere of substantially the same oxygen pressure. It is not necessary and in general undesirable to bubble oxygen into the test solution. The iridium electrode is quite insensitive to wide variations in oxygen pressure but under conditions of substantially higher or substantially lower oxygen pressure it may be necessary to recalibrate the measuring apparatus.

While herein there has been described the use in association with our measuring electrode of a calomel half-cell or reference electrode, it shall be understood other suitable half-cells may be used; for example, the reference half-cell may be of the so-called silver/silver chloride type, of the quinhydrone type or of the hydrogen gas type. When necessary, the reference half-cell should be isolated by a salt-bridge from the test-solution; for example, if the reference half-cell is a hydrogen gas electrode, the latter is disposed in a solution of known constant pH and electrically connected to the test solution through a salt-bridge.

We disclaim, as the measuring electrode of a cell for measurement of magnitudes of pH, a metallized glass electrode consisting of a film of iridium on glass.

What we claim is:

1. A cell for measuring the pH of a solution containing molecular oxygen and free of molecular hydrogen comprising in contact with the solution a non-porous iridium measuring electrode, uncontaminated by occluded hydrogen, and whose voltage/pH characteristic is consistently 2. A cell for measuring the pH of a solution containing molecular oxygen and free of molecular hydrogen comprising in contact with the solution a non-porous iridium measuring electrode, uncontaminated by occluded hydrogen, and whose voltage/pH characteristic, for current densities less than $10^{-7}$ ampere per square centimeter of area of contact with the solution, is consistently reproducible and approximates that of the theoretical oxygen electrode.

3. A cell for measuring the pH of a solution containing molecular oxygen and free of molecular hydrogen comprising in contact with the solution a non-porous iridium measuring electrode, uncontaminated by occluded hydrogen, and whose voltage/pH characteristic is consistently reproducible and throughout the range of 0 pH to 14 pH and for temperatures of the solution from about 0° C. to about 100° C. approximates the characteristic of the theoretical oxygen electrode.

4. A cell for measuring the pH of a solution containing molecular oxygen and free of molecular hydrogen comprising in contact with the solution a non-porous iridium measuring electrode, uncontaminated by occluded hydrogen, and which in contact with the solution produces potentials, in relation to a calomel reference electrode, ranging, in consistently reproducible linear characteristic, from about .7 volt at 0 pH to about minus .1 volt at 14 pH.

5. A cell for measuring the pH of a solution containing molecular oxygen and free of molecular hydrogen, and containing ions of one or more of the metals copper, silver, lithium, sodium and potassium, comprising in contact with the solution a non-porous iridium measuring electrode, uncontaminated by occluded hydrogen, and whose voltage/pH characteristic is consistently reproducible and approximates that of the theoretical oxygen electrode.

6. A cell for measuring the pH of a solution containing molecular oxygen and free of molecular hydrogen, and containing ions of one or more of the metals copper, silver, lithium, sodium and potassium, comprising in contact with the solution a non-porous iridium measuring electrode, uncontaminated by occluded hydrogen, and which in contact with the solution produces potentials, in relation to a calomel reference electrode, ranging, in consistently reproducible linear characteristic, from about plus .7 volt at 0 pH to about minus .1 volt at 14 pH.

7. A cell for measuring the pH of a solution containing molecular oxygen and free of molecular hydrogen comprising in contact with said solution a measuring electrode of iridium to such extent non-porous and uncontaminated by occluded hydrogen that the resultant voltage/pH characteristic, for current densities less than $10^{-7}$ ampere per square centimeter of area of contact of said electrode with said solution and for temperatures of said solution from about 0° C. to about 100° C., is consistently reproducible, linear and approximates the characteristic of the theoretical oxygen electrode.

8. A cell for measuring the pH of a solution containing molecular oxygen and free of molecular hydrogen, and containing ions of one or more of the metals copper, silver, lithium, sodium and potassium, comprising in contact with said solution a measuring electrode of iridium, non-porous and uncontaminated by occluded hydrogen, and whose voltage/pH characteristic, for current densities less than $10^{-7}$ ampere per square centimeter of area of contact with said solution and for a temperature of said solution from about 0° C. to about 100° C., is consistently reproducible and linear from about plus .7 volt at 0 pH to about minus .1 volt at 14 pH.

GEORGE A. PERLEY.
JAMES B. GODSHALK.

REFERENCES CITED

The following references are of record in the file of this patent:

UNITED STATES PATENTS

| Number | Name | Date |
| --- | --- | --- |
| 1,846,354 | Parker et al. | Feb. 23, 1932 |
| 2,192,123 | Bennett | Feb. 27, 1940 |
| 2,143,723 | Walker et al. | Jan. 10, 1939 |
| 2,071,697 | Larrabee | Feb. 23, 1937 |
| 2,256,771 | Berghaus et al. | Sept. 23, 1941 |
| 1,970,950 | Wise | Aug. 21, 1934 |
| 1,513,558 | Parker | Oct. 28, 1924 |
| 2,058,761 | Beckman et al. | Oct. 27, 1936 |
| 2,329,896 | Harsch | Sept. 21, 1943 |
| 1,624,845 | Nyberg | Apr. 12, 1927 |
| 1,696,873 | Wood | Dec. 25, 1928 |
| 2,164,755 | Marhenkel | July 4, 1939 |
| 2,081,926 | Gyuris | June 1, 1937 |

OTHER REFERENCES

Bain—The Electrochemical Society, Inc., preprint 78–16. Manuscript received Jan. 3, 1939—17 pages.

Tartar et al.—Journal of Physical Chemistry, volume 32, No. 8 (1928), pages 1171–1177.

Muller et al.—Article abstracted in Chemical Abstracts, volume 25, page 5853 (1931).

Lepper et al.—Article in British Journal of Experimental Pathology, volume 11, pages 137–139, 140–145 (1930), (London).

Glasstone et al.—"Electrolytic Oxidation and Reduction" (book), published 1936 by D. Van Nostrand Co., pages 27, 32.